(12) United States Patent
Alptekin et al.

(10) Patent No.: US 12,511,463 B2
(45) Date of Patent: Dec. 30, 2025

(54) BACKSIDE CONTACTS FOR SIGNAL ROUTING

(71) Applicant: Apple Inc., Cupertino, CA (US)

(72) Inventors: Emre Alptekin, Santa Clara, CA (US); Antonietta Oliva, Sausalito, CA (US)

(73) Assignee: Apple Inc., Cupertino, CA (US)

( * ) Notice: Subject to any disclaimer, the term of this patent is extended or adjusted under 35 U.S.C. 154(b) by 619 days.

(21) Appl. No.: 17/823,644

(22) Filed: Aug. 31, 2022

(65) Prior Publication Data

US 2024/0070365 A1 Feb. 29, 2024

(51) Int. Cl.
*G06F 30/392* (2020.01)
*G06F 30/394* (2020.01)

(52) U.S. Cl.
CPC .......... *G06F 30/392* (2020.01); *G06F 30/394* (2020.01)

(58) Field of Classification Search
USPC ........................................................ 716/100
See application file for complete search history.

(56) References Cited

U.S. PATENT DOCUMENTS

| 8,174,124 | B2 | 5/2012 | Chiu et al. |
| 9,754,887 | B2 | 9/2017 | Kim |
| 9,793,211 | B2 | 10/2017 | Peng et al. |
| 10,074,570 | B2 | 9/2018 | Anderson et al. |
| 10,424,577 | B2 | 9/2019 | Lee et al. |
| 2015/0162448 | A1 | 6/2015 | Raghavan et al. |
| 2015/0333056 | A1 | 11/2015 | Du et al. |
| 2016/0247569 | A1 | 8/2016 | Nii |
| 2017/0062421 | A1 | 3/2017 | Cosemans et al. |
| 2017/0110461 | A1 | 4/2017 | Fujiwara et al. |
| 2017/0243650 | A1 | 8/2017 | Ogawa et al. |

(Continued)

FOREIGN PATENT DOCUMENTS

| JP | 2010-171166 A | 8/2010 |
| JP | 2016-517625 A | 6/2016 |

(Continued)

OTHER PUBLICATIONS

International Search Report and Written Opinion in PCT Appl. No. PCT/US2023/029567 mailed Nov. 21, 2023, 11 pages.

(Continued)

*Primary Examiner* — Mohammed Alam
(74) *Attorney, Agent, or Firm* — Kowert, Hood, Munyon, Rankin & Goetzel, P.C.; Gareth M. Sampson; Dean M. Munyuon

(57) ABSTRACT

A cell layout that may be implemented in FinFET devices or other FET devices is disclosed. The cell layout utilizes an isolation gate structure to provide routing between a signal input of an active gate and a backside metal layer. The isolation gate structure includes a metal fill surrounded by gate spacers. The metal fill connects between the topside layers in the device and the backside layer in the device. The metal fill may be connected to the signal input of the active gate through routing either in a topside metal layer or a metal wire placed in a topside insulating layer. The isolation gate structure can be part of any standard cell being placed at a cell boundary or inside the cell to provide access to backside signal routing. Additionally, filler cells with isolation gate structures may provide backside routing connections for adjacent functional cells.

20 Claims, 13 Drawing Sheets

(56) References Cited

U.S. PATENT DOCUMENTS

| | | |
|---|---|---|
| 2017/0294448 A1 | 10/2017 | Debacker et al. |
| 2018/0174642 A1 | 6/2018 | Huynh Bao et al. |
| 2018/0175193 A1 | 6/2018 | Raghavan et al. |
| 2019/0043564 A1 | 2/2019 | Madraswala et al. |
| 2019/0259699 A1 | 8/2019 | Morrow et al. |
| 2019/0287863 A1 | 9/2019 | Xie et al. |
| 2019/0378790 A1 | 12/2019 | Bohr et al. |
| 2019/0386026 A1 | 12/2019 | Molin et al. |
| 2020/0006378 A1 | 1/2020 | Huo |
| 2020/0006429 A1 | 1/2020 | McCollum et al. |
| 2020/0135645 A1 | 4/2020 | Rubin et al. |
| 2020/0327274 A1 | 10/2020 | Chen et al. |
| 2021/0027005 A1 | 1/2021 | Yuan et al. |
| 2021/0242870 A1 | 8/2021 | Kim et al. |
| 2021/0305262 A1 | 9/2021 | Wang et al. |
| 2021/0343332 A1 | 11/2021 | Chiu et al. |
| 2021/0358850 A1 | 11/2021 | Chen |
| 2021/0358901 A1 | 11/2021 | Liu |
| 2021/0391318 A1 | 12/2021 | Peng et al. |
| 2021/0391464 A1 | 12/2021 | Bae et al. |
| 2022/0037340 A1* | 2/2022 | Yang ................ H01L 21/02126 |
| 2022/0122971 A1 | 4/2022 | Peng et al. |
| 2022/0123023 A1 | 4/2022 | Peng et al. |
| 2022/0199624 A1 | 6/2022 | Huang et al. |
| 2022/0223514 A1 | 7/2022 | Sisodia et al. |
| 2022/0262731 A1 | 8/2022 | Park et al. |
| 2022/0359491 A1 | 11/2022 | Chen et al. |
| 2022/0399402 A1 | 12/2022 | Leng |
| 2023/0067140 A1 | 3/2023 | Chen et al. |
| 2023/0067715 A1 | 3/2023 | Yuh et al. |
| 2023/0068280 A1 | 3/2023 | Lin et al. |
| 2023/0197612 A1 | 6/2023 | Majhi et al. |
| 2023/0207465 A1 | 6/2023 | Wei et al. |
| 2023/0292631 A1 | 9/2023 | Lee et al. |
| 2024/0070365 A1* | 2/2024 | Alptekin ................ G06F 30/394 |
| 2024/0381610 A1* | 11/2024 | Wang ................... H10B 10/125 |
| 2025/0212377 A1* | 6/2025 | Chang ................. H10B 10/125 |
| 2025/0240937 A1 | 7/2025 | Liaw |

FOREIGN PATENT DOCUMENTS

| | | | | |
|---|---|---|---|---|
| JP | 2017-511596 A | | 4/2017 | |
| KR | 20250043550 A | * | 3/2025 | ........... G06F 30/392 |
| TW | 315468 B | | 9/1997 | |
| TW | 201240015 A | | 10/2012 | |
| TW | 201532125 A | | 8/2015 | |
| TW | 201539469 A | | 10/2015 | |
| TW | 201543662 A | | 11/2015 | |
| TW | 201606895 A | | 2/2016 | |
| TW | 201730970 A | | 9/2017 | |
| TW | 201816982 A | | 5/2018 | |
| TW | 201933578 A | | 8/2019 | |
| TW | 202027184 A | | 7/2020 | |
| TW | 202103161 A | | 1/2021 | |
| TW | 202145310 A | | 12/2021 | |
| TW | 202145524 A | | 12/2021 | |
| TW | 202213791 A | | 4/2022 | |
| TW | 202217976 A | | 5/2022 | |
| WO | 2021/124000 A1 | | 6/2021 | |
| WO | WO-2024049617 A1 | * | 3/2024 | ........... G06F 30/392 |

OTHER PUBLICATIONS

Office Action in Taiwanese Appl. No. 112132950 mailed Feb. 23, 2024, 4 pages.

* cited by examiner

US 12,511,463 B2

BACKSIDE CONTACTS FOR SIGNAL ROUTING

BACKGROUND

Technical Field

Embodiments described herein relate to signal routing in semiconductor devices. More particularly, embodiments described herein relate to signal routing through backside layers of integrated circuits.

Description of the Related Art

Standard cells are groups of transistors, passive structures, and interconnect structures that can provide logic functions, storage functions, etc. Current trends in standard cell methodology are towards reducing the size of standard cells while increasing the complexity (e.g., circuit density and number of components) within standard cells. As standard cell designs become smaller, however, it becomes more difficult to provide access (e.g., connections) to components within the standard cells.

Additionally, performance of standard cells may become more affected by properties within the cell as the size of standard cells decreases. For example, resistances within a standard cell, such as in metal traces or interfaces between diffusion regions and metal traces in the cell, may reduce performance of the cell with the effect on performance becoming more of an issue as the cell becomes smaller. Thus, reducing trace resistances within a standard cell may increase performance of the cell.

BRIEF DESCRIPTION OF THE DRAWINGS

Features and advantages of the methods and apparatus of the embodiments described in this disclosure will be more fully appreciated by reference to the following detailed description of presently preferred but nonetheless illustrative embodiments in accordance with the embodiments described in this disclosure when taken in conjunction with the accompanying drawings in which.

Figure 1:
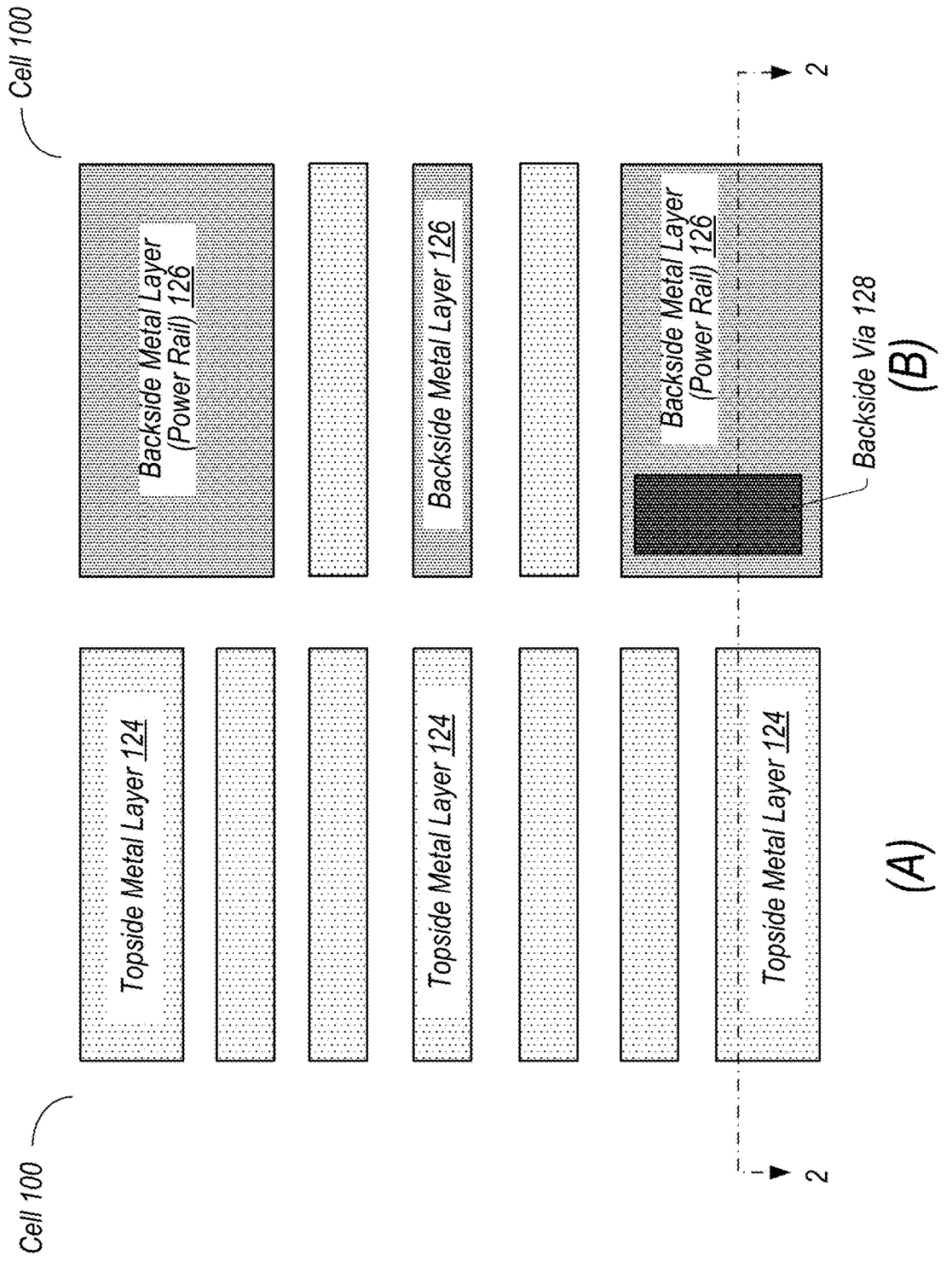
FIG. 1 depicts representations of an embodiment of a standard cell with backside layer power connections, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

DETAILED DESCRIPTION OF EMBODIMENTS

The present disclosure is directed to the utilization of backside metal layers for providing control signal connections to transistors in integrated circuit cells (such as standard cells). As used herein, the term "standard cell" refers to a group of transistor structures, passive structures, and interconnect structures formed on a substrate to provide logic or storage functions that are standard for a variety of implementations. Integrated circuit cells may also include custom circuit design cells that are individually designed for a particular implementation. Embodiments of circuit design cells described herein may be implemented in various implementations of logic integrated circuits or memory integrated circuits.

Many current designs of cells provide connections and routing for power or signals to transistors or other structures in areas above the transistors. For example, the connections and routing for power or signals may be provided in topside layers of the device (e.g., layers above the active layer of transistors in the device when viewed in a typical cross-sectional view). As used herein, the term "topside" refers to areas in a device that are vertically above an active layer of the device (e.g., above a transistor region of the device). For example, topside may refer to components such as contacts or layers that are above a transistor region in a vertical dimension, as depicted in the figures and described herein. In some instances, the term "frontside" may be used interchangeably with the term "topside".

Some recent developments for designs of standard cells move connections and routing for power connections to metal layers below the transistors. For example, the connections and routing for power may be provided in the backside layers of the device (e.g., layers below the active layer of transistors in the device when viewed in a typical cross-sectional view). As used herein, the term "backside" refers to areas in a device that are vertically below an active layer of the device (e.g., below a transistor region of the device). For example, backside may refer to components such as contacts or layers that are below a transistor region in a vertical dimension, as depicted in the figures and described herein. It is noted that as used herein, backside elements located below an active layer may be situated above, within, or below a silicon substrate on which the active layer is manufactured. That is, as used herein, "backside" is relative to the active layer, rather than the silicon substrate.

Figure 2:
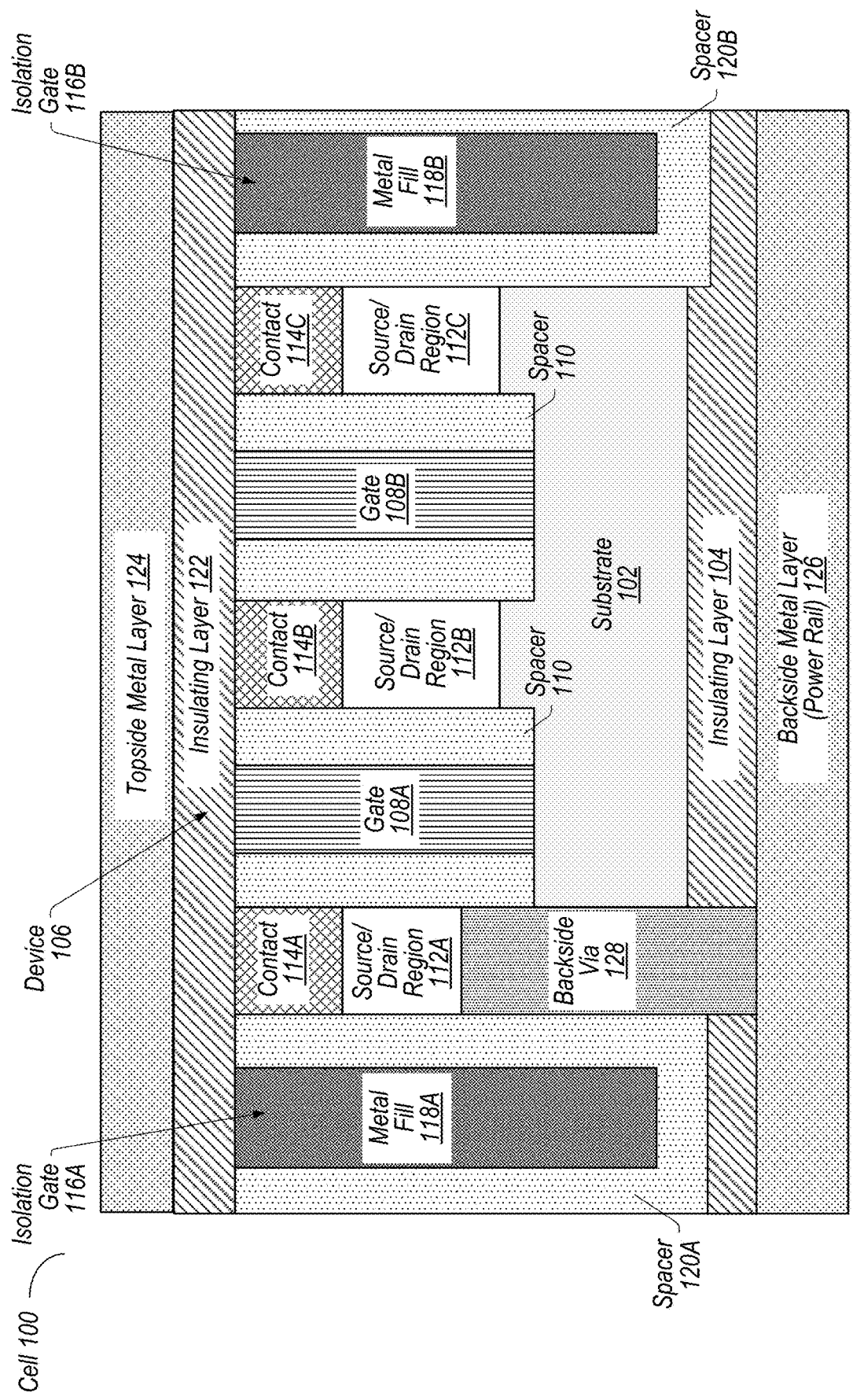
FIG. 2 depicts a cross-sectional representation of the standard cell along the sectional lines 2-2 shown in FIG. 1, according to some embodiments.

FIG. 1 depicts representations of an embodiment of a standard cell with backside layer power connections, according to some embodiments. For simplicity in the drawings, only components relevant to the disclosure are shown in the representations of a cell disclosed herein. A person with knowledge in the art would understand that additional components may be present in any of the cells depicted herein. For instance, in FIG. 1, gates extending vertically in the drawing may be visible in some depictions. In FIG. 1, (A) is a top-view representation of the embodiment of standard cell 100 and (B) is a bottom-view representation of the embodiment of the standard cell. FIG. 2 depicts a cross-sectional representation of standard cell 100 along the sectional lines 2-2 shown in FIG. 1, according to some embodiments. The sectional lines 2-2 are positioned across the power rail of backside metal layer 126, as shown in (B) of FIG. 1. A representation of backside via 128, described further below, is depicted in (B) of FIG. 1.

In the illustrated embodiment of FIG. 2, standard cell 100 includes substrate 102. In certain embodiments, substrate 102 is a silicon substrate. In various embodiments, substrate 102 may include additional components or features for implementation in cell 100. For instance, substrate 102 may include insulating layer 104 (e.g., an oxide layer), diffusion (e.g., oxide diffusion) regions, or doped regions for implementation in cell 100. For simplicity in the drawing, substrate 102 and insulating layer 104 are depicted as single layers. In some embodiments, insulating layer 104 may include multiple insulating layers. For instance, insulating layer 104 may include multiple oxide layers, multiple nitride layers, or a combination of various insulating layers.

In various embodiments, standard cell 100 includes device 106 formed on substrate 102. Device 106 may be, for example, a transistor such as a FinFET device, a nanosheet FET (NSH) device, or a GAAFET ("gate-all-around" FET) device. Other embodiments of transistor devices may also be contemplated. In various embodiments, device 106 includes gates 108, gate spacers 110, source/drain regions 112, and source/drain contacts 114 formed above in substrate 102.

In certain embodiments, gates 108 (e.g., gates 108A, 108B) are active gates in device 106. Gates 108 may be, for example, poly lines (e.g., polysilicon layers or metal layers). Gate spacers 110 may be positioned between gates 108 and source/drain regions 112. In various embodiments, gate spacers 110 are formed as parts of gates 108 (e.g., the gates and spacers are formed in the same process flow). Source/drain regions 112 (e.g., source/drain regions 112A, 112B, 112C) are positioned on sides of gates 108 and spacers 110. Source/drain regions 112 may be, for example, epitaxial layers grown on fins or nanosheet stacks or any 2D (two-dimensional) channel materials. Various embodiments may also be contemplated where source/drain regions 112 are at least partially positioned in substrate 102.

In certain embodiments, isolation gates 116 are positioned on opposing sides of device 106. Isolation gates 116 may include metal fill 118 and spacers 120. In some embodiments, isolation gates 116 may include only insulator materials (e.g., fill 118 is insulator material). As shown in the illustrated embodiment of FIG. 2, isolation gates 116 (e.g., gates 116A, 116B) provide isolation on each side of device 106 with metal fill 118A, 118B and spacers 120A, 120B extending into substrate 102 below the active regions of the device (e.g., below the transistor of device 106). Additionally, spacers 120 extend into insulating layer 104 such that isolation gates 116 define isolation for device 106 and provide electrical signal isolation between the device 106 and neighboring devices.

In certain embodiments, insulating layer 122 and topside metal layer 124 are formed above device 106 and isolation gates 116 (e.g., in the topside of the device). Insulating layer 122 may include one or more insulating layers formed above device 106. For instance, insulating layer 122 may include one or more oxide layers. In various embodiments, insulating layer 122 at least partially surrounds or encapsulates the regions of device 106 (e.g., gates 108, spacers 110, source/drain regions 112, and contacts 114) and isolation gates 116.

In the illustrated embodiment, topside metal layer 124 includes one or more metal layers that provide routing for device 106 and/or other devices in cell 100. In various embodiments, topside metal layer 124 provides routing for connections to control signals to/from device 106. For example, gates 108 may be connected to various metal routing in topside metal layer 124 by vias or other connections through insulating layer 122. As used herein, the term "metal routing" refers to any combination of metal vias, metal wires, metal traces, etc. that provide a path/route between two structures. Additional embodiments may be contemplated where the metal in "metal routing" is replaced with an alternative conductive material. For instance, the metal in "metal routing" may be replaced with a superconductor material, a semiconductor material, or a non-metal conductor.

In various embodiments of cell 100, backside metal layer 126 is formed below device 106 (e.g., in the backside of the device). In certain embodiments, backside metal layer 126 includes one or more metal layers that provide power connections for device 106 (e.g., the backside metal layer is a power rail for device 106). For instance, backside metal layer 126 may include one or more metal layers that provide power routing from device 106 to Vdd (e.g., the supply voltage) and Vss (e.g., ground).

In the illustrated embodiment, power connection to source/drain region 112A in device 106 is made by backside via 128 from backside metal layer 126. Backside via 128 provides a connection between source/drain region 112A and backside metal layer 126 through substrate 102 and insulating layer 104. In some embodiments, backside via 128 is a buried vias through substrate 102 and insulating layer 104.

In various embodiments, as shown in FIG. 2, backside metal layer 126 is formed at or near a bottom surface of substrate 102. In certain embodiments, backside metal layer 126 includes one or more backside layers of an active layer of device 106 (e.g., backside metal layer is vertically below the transistor region of device 106). In some embodiments, backside metal layer 126 includes one or more buried layers in substrate 102 (e.g., the metal layers are buried or embedded underneath the bottom surface of the substrate). In some embodiments, backside metal layer 126 is buried beneath a carrier substrate layer (e.g., a silicon carrier substrate).

Additional embodiments may be contemplated where backside metal layer 126 is not located in substrate 102.

The embodiment of standard cell 100, depicted in FIGS. 1 and 2, may improve the utilization of area within the cell layout. While providing backside power routing provides improvement in area utilization, further improvements in area utilization may be achieved by routing signal connections (e.g., connections for control signals, data signals, or other signals that are not associated with power) through the backside of the device in addition to the topside of the device. Providing additional signal connections or routing through the cell may reduce RC delay, which typically comes from resistances at via connections in the topside layers of the cell.

A challenge in routing signals through backside layers, however, is providing a reasonable and implementable approach to route the signal from the topside of an active gate to the backside metal layer. For example, routing signal connections from gates to the backside layers may place signal and supply connections in close proximity, thereby causing parasitic issues that reduce reliability of the device. Additionally, forming signal connections to gates from the backside layers may require a highly controlled process to be able to place the signal connections and power connections in close proximity, thereby increasing costs and lowering device yields. The present disclosure contemplates utilizing signal paths through isolation regions of the device (e.g., isolation gates) to provide routing paths with low resistance that are implementable in both logic and memory cell designs. Isolation gates, as described herein, may be part of any standard cell being placed at a cell boundary or may be placed inside a cell to provide access for backside signal routing. Providing the signal routing paths described herein may provide better cell performance, power utilization, and area utilization.

Certain embodiments disclosed herein have three broad elements: 1) a metal layer located below a transistor region of an integrated circuit device (e.g., a backside metal layer), 2) a gate structured formed in the transistor region on a side of an active gate of a transistor where the gate structure includes a metal fill positioned between gate spacers with the metal fill being connected to the metal layer, and 3) a metal wire located above the transistor region where the metal wire connects the metal fill to a signal input of the active gate. In certain embodiments, the gate structure is an isolation gate structure positioned to the side of an active region of the integrated circuit device (e.g., on the sides of active gates in the device) and the metal layer is a backside metal layer having wiring for propagating signals (e.g., control signals). In some embodiments, the metal fill is connected to the backside metal layer by a gate contact or other connecting structure.

In various embodiments, the metal wire is located in a topside metal layer above the transistor region. Gate contacts or other connecting structures may connect the metal fill in the gate structure to the metal wire in the topside metal layer. Accordingly, the metal fill in the gate structure connects the topside metal layer to the backside metal layer through the gate contacts. In such embodiments, the gate structure provides a connection path between the signal input of the active gate and the backside metal layer to allow routing of signals from the active gate to signal wiring in the backside metal layer.

In some embodiments, the metal wire is located in an insulating layer between the transistor region and the topside metal layer. For instance, the metal wire may be a jumper or cross-coupler that connects the signal input of the active gate to the metal fill in the gate structure. The metal wire may include gate contacts through the insulating layer to the signal input of the active gate and the top of the metal fill. With the metal wire connecting the signal input of the active gate to the metal fill, a connection path between the signal input of the active gate and the backside metal layer is provide through the metal fill to allow routing of signals from the active gate to signal wiring in the backside metal layer.

In short, the present inventors have recognized that an isolation gate structure can be utilized to provide a connection path between a signal input of an active gate and a backside metal layer. Utilizing the isolation gate structures provides little to no impact on area cost in the integrated circuit device and without significant change to processes for making the integrated circuit device. Being able to route a control signal from the active gate through the backside metal layer within the device structure may improve performance, power utilization, and area scaling in the integrated circuit device, as described herein.

Figure 3:
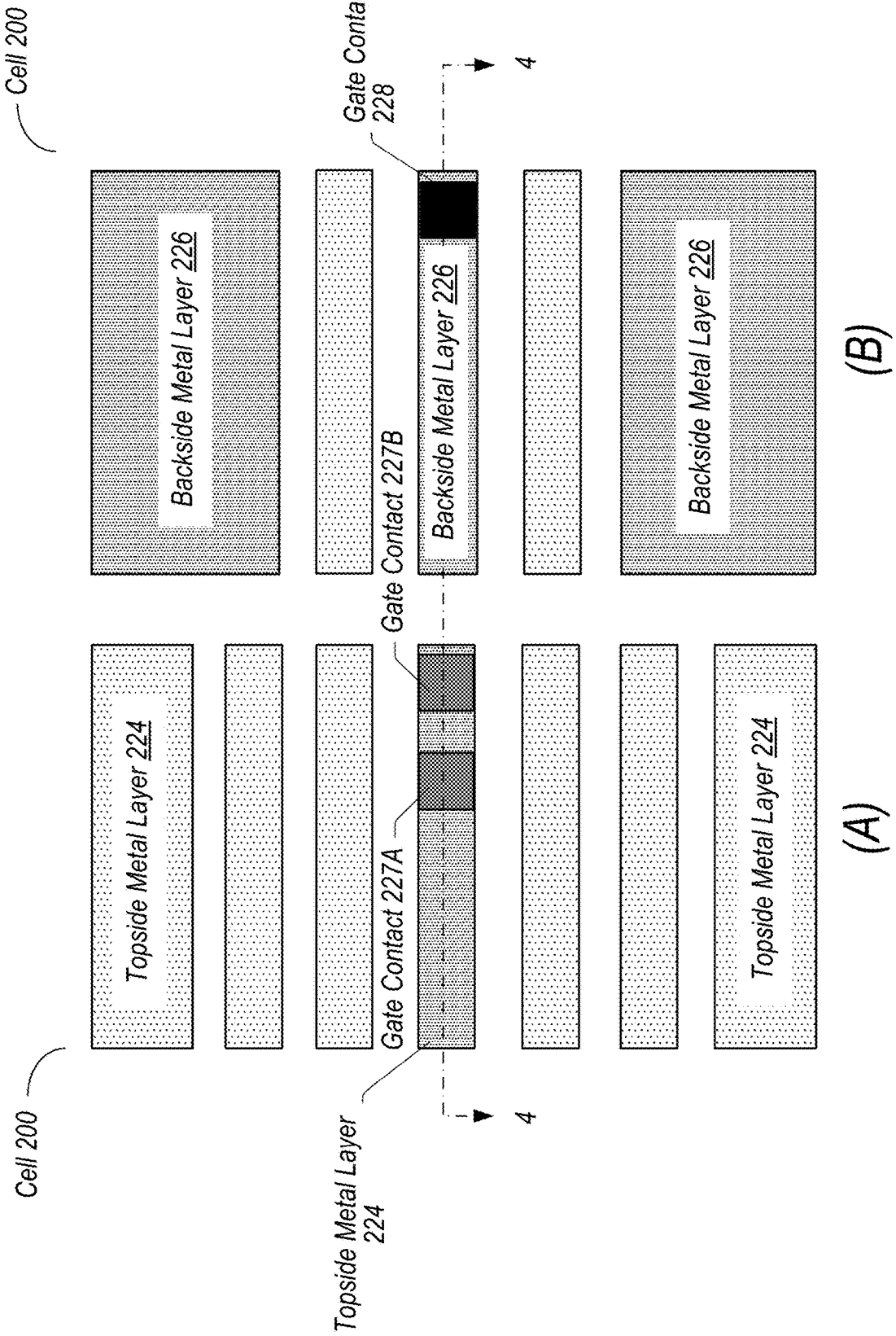
FIG. 3 depicts representations of an embodiment of a cell with routing between the active gate and the backside metal layer through an isolation gate structure, according to some embodiments.
Figure 4:
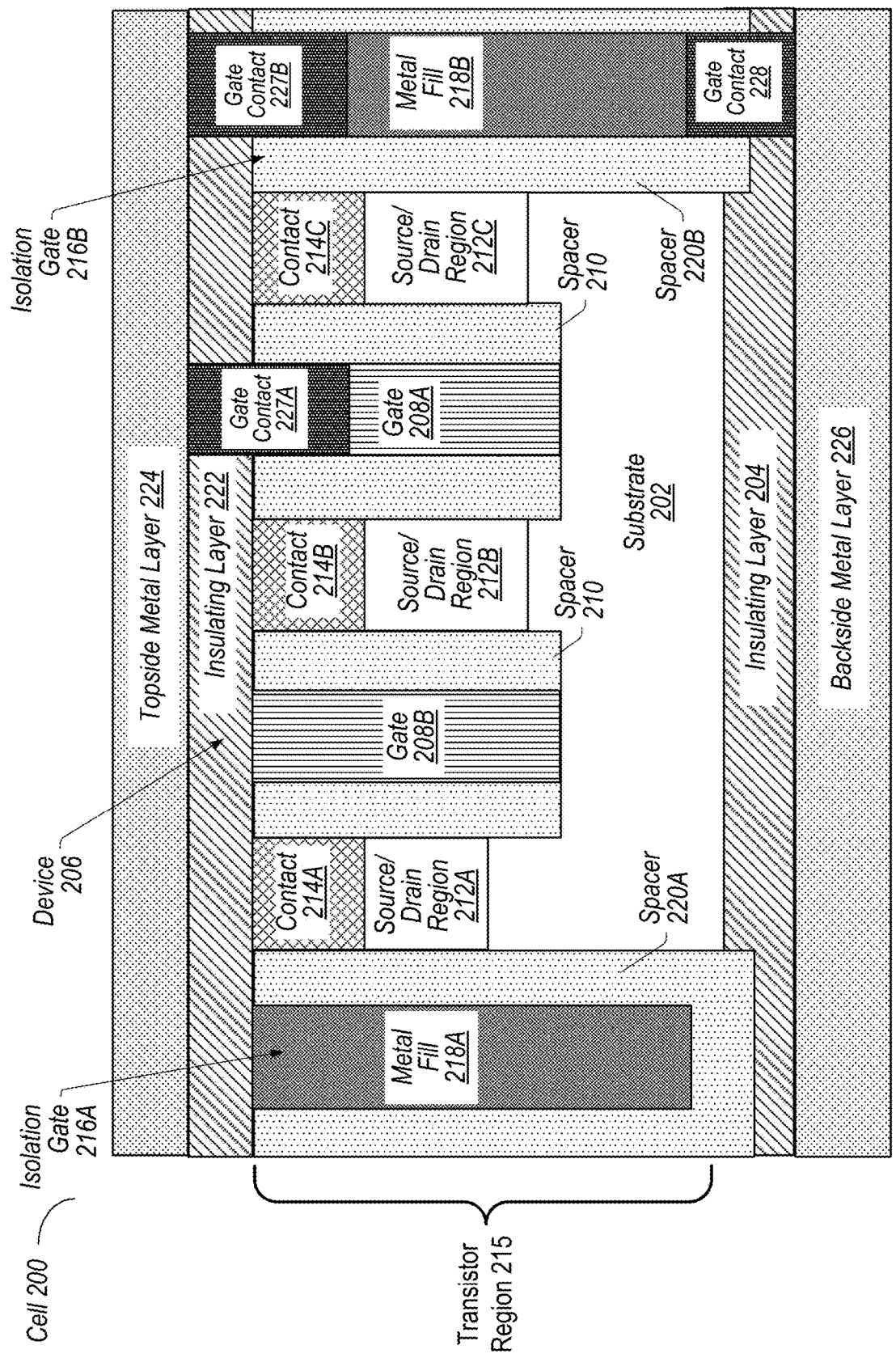
FIG. 4 depicts a cross-sectional representation of a cell along the sectional lines 4-4 shown in FIG. 3, according to some embodiments.

FIG. 3 depicts representations of an embodiment of a cell with routing between the active gate and the backside metal layer through an isolation gate structure, according to some embodiments. In FIG. 3, (A) is a top-view representation of the embodiment of cell 200 and (B) is a bottom-view representation of the embodiment of the cell. FIG. 4 depicts a cross-sectional representation of cell 200 along the sectional lines 4-4 shown in FIG. 3, according to some embodiments. The sectional lines 4-4 are positioned across the signal portions of topside metal layer 224 and backside metal layer 226, as shown in (B) of FIG. 3. Representations of gate contacts 227A, 227B, described further below, are depicted in (A) of FIG. 3 while a representation of gate contact 228, also described further below, is depicted in (B) of FIG. 3.

In the illustrated embodiment of FIG. 4, cell 200 includes substrate 202. In certain embodiments, substrate 202 is a silicon substrate. In various embodiments, substrate 202 may include additional components or features for implementation in cell 200. For instance, substrate 202 may include insulating layer 204, diffusion regions, or doped regions for implementation in cell 200. In certain embodiments, insulating layer 204 includes one or more oxide layers. For simplicity in the drawing, substrate 202 and insulating layer 204 are depicted as single layers. In some embodiments, insulating layer 204 may include multiple insulating layers (e.g., multiple oxide layers).

In the illustrated embodiment, cell 200 includes device 206 formed on substrate 202. Device 206, as with device 106, described above, may be, a transistor such as a FinFET device, a nanosheet FET (NSH) device, or a GAAFET ("gate-all-around" FET) device. In certain embodiments, device 206 includes gates 208A, 208B, gate spacers 210, source/drain regions 212A-C, and source/drain contacts 214A-C formed in transistor region 215 of device 206 in cell 100.

In certain embodiments, isolation gates 216A, 216B are positioned on opposing sides of device 206. Isolation gates 216A, 216B may include metal fill 218A, 218B, respectively, and spacers 220A, 220B, respectively. In various embodiments, as shown in FIG. 4, spacers 220A, 220B extend into insulating layer 204. Accordingly, isolation gates 216A, 216B provide isolation on each side of device 206 with metal fill 218A, 218B and spacers 220A, 220B extending into substrate 202 below the active regions of the device (e.g., below the transistor). Accordingly, isolation gates 216 define an isolation region for device 206 and provide electrical signal isolation between the device 206 and neighboring devices.

In certain embodiments, gates 108A, 108B are active gates in device 206. Gates 108A, 108B may include, for example, poly lines (e.g., polysilicon layers or metal layers) that form the active parts of the gates. Gate spacers 210 may be positioned between gates 208 and source/drain regions 212 to define the active gates. In various embodiments, gate spacers 210 are formed as parts of gates 208 (e.g., the gates and spacers are formed in the same process flow). Source/drain regions 212A, 212B, 212C are positioned on sides of gates 208A, 208B, 208C. Source/drain regions 212A, 212B, 212C may be, for example, fins or nanosheet stacks in FinFETs or NSH devices. Various embodiments may also be contemplated where source/drain regions 212A, 212B, 212C are at least partially positioned in substrate 202.

In certain embodiments, insulating layer 222 and topside metal layer 224 are formed above device 206 and isolation gates 216 (e.g., in the topside of the device above transistor region 215). Insulating layer 222 may include one or more insulating layers formed above transistor region 215. For instance, insulating layer 222 may include one or more oxide or nitride layers. In various embodiments, insulating layer 222 at least partially surrounds or encapsulates transistor region 215 of device 106 (e.g., gates 208, spacers 210, source/drain regions 212, contacts 214, and isolation gates 216).

In various embodiments, topside metal layer 224 includes one or more metal layers above insulating layer 222. Topside metal layer 224 may provide signal routing (e.g., control signal routing) for device 206. For instance, metal routing in topside metal layer 224 may provide signal routing for device 206. In the illustrated embodiment of cell 200, backside metal layer 226 is formed below insulating layer 204 in device 206 (e.g., in the backside of the device below transistor region 215).

In certain embodiments, as shown in FIG. 4, backside metal layer 226 is formed at or near a bottom surface of substrate 202. In some embodiments, backside metal layer 226 includes one or more backside layers of an active layer of device 206 (e.g., backside metal layer is vertically below transistor region 215 of device 206). In some embodiments, backside metal layer 226 includes one or more buried layers in substrate 202 (e.g., the metal layers are buried or embedded underneath the bottom surface of the substrate). In some embodiments, backside metal layer 226 is buried beneath a carrier substrate layer (e.g., a silicon carrier substrate). Additional embodiments may be contemplated where backside metal layer 226 is not located in substrate 202.

In certain embodiments, backside metal layer 226 provides signal routing (e.g., control signal routing) between device 206 and/or other devices in cell 200. For instance, backside metal layer 226 may include metal routing that routes a control signal from device 206 to another device in cell 200 (or a device in another cell).

As described herein, the metal routing in backside metal layer 226 may be implemented in combination with metal routing above transistor region 215 (e.g., metal routing in topside metal layer 224) and metal routing through an isolation gate structure (e.g., routing through metal fill 218 in isolation gate 216) to provide a signal route path between a signal input of an active gate in device 206 and another device. In the illustrated embodiment of FIG. 4, the signal input of gate 208A is connected to topside metal layer 224 by gate contact 227A. Further, the top of metal fill 218B in isolation gate 216B is connected to topside metal layer 224 by gate contact 227B. Gate contacts 227A, 227B may be metal vias or other connections made between transistor region 215 and topside metal layer 224 through insulating layer 222.

In certain embodiments, gate contact 227A connects the signal input of gate 208A to metal routing in topside metal layer 224 that further connects to gate contact 227B. Gate contact 227B then connects the metal routing in topside metal layer 224 to metal fill 218B in isolation gate 216B. A bottom of metal fill 218B then connects to metal routing in backside metal layer 226 through insulating layer 204 using gate contact 228 (e.g., a gate contact via through the insulating layer). Metal fill 218B thus provides a connection between metal routing in topside metal layer 224 and metal routing in backside metal layer 226. Accordingly, the metal fill 218B in isolation gate 216B provides a path for routing a control signal from a topside of device 206 to a backside of the device. As isolation gate 216B is typically included in a standard cell layout, the implementation of metal fill 218B to provide connection between metal routing in topside metal layer 224 and metal routing in backside metal layer 226 has little to no impact on area utilization in cell 200.

Additionally, for the embodiment of cell 200 illustrated in FIG. 4, the metal wire in topside metal layer 224 providing connection between gate contact 227A and gate contact 227B has a relatively short length providing a small electrical resistance. Thus, the connection between the signal input of gate 208A and metal fill 218B may provide a low RC delay for transmitting the signal. Further, in cell 200, metal fill 218B may have a low electrical resistance due to the volume of metal forming the metal fill. The low electrical resistance of metal fill 218B may reduce the impact of routing the signal through isolation gate 216B on the RC delay of the signal.

An alternative to utilizing the metal routing in topside metal layer 224 for connecting the signal input of gate 208A and metal fill 218B in isolation gate 216B may be the addition of a metal wire (or other metal structure) in insulating layer 222 that connects the signal input of the gate and the metal fill in the isolation gate.

Figure 5:
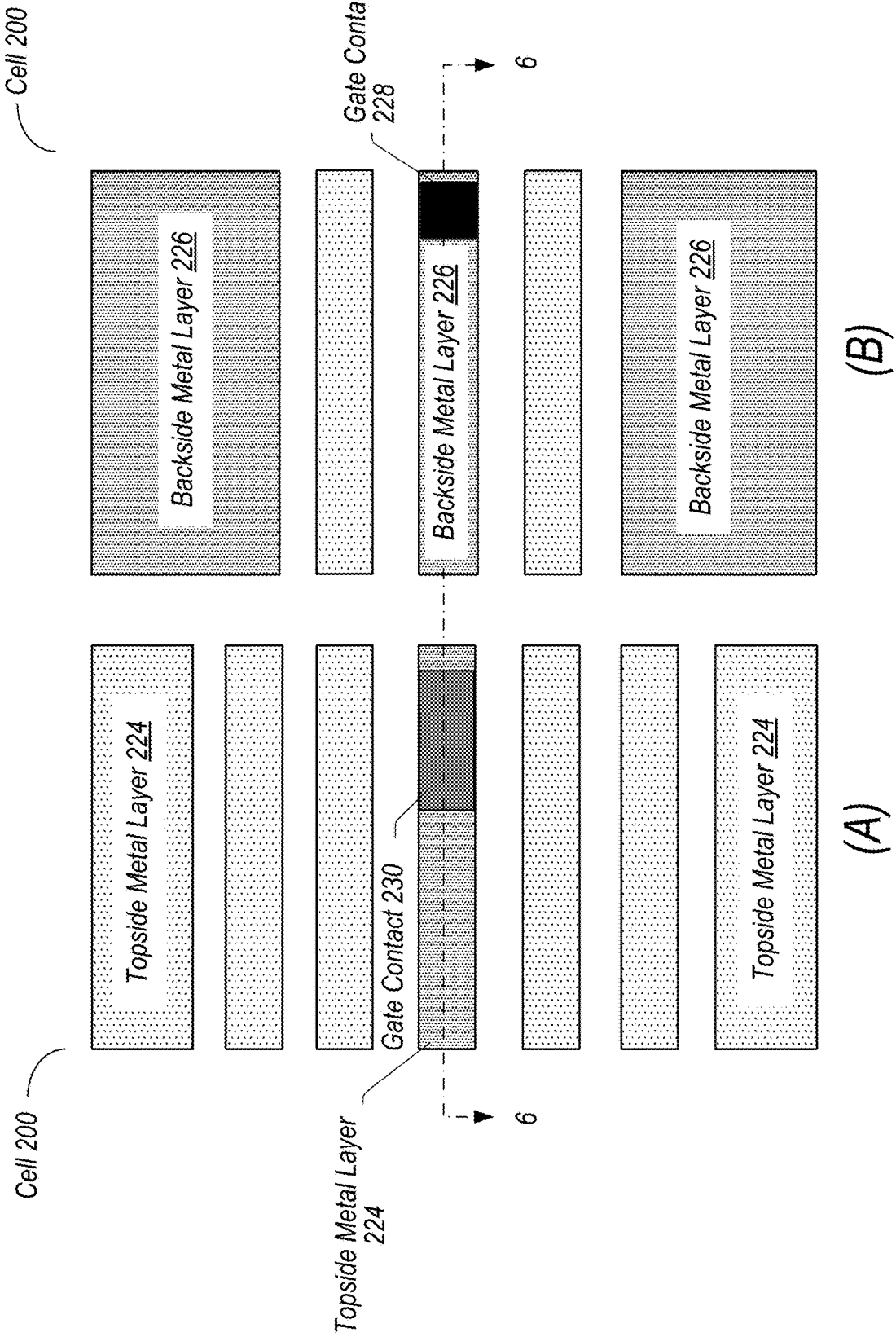
FIG. 5 depicts representations of an embodiment of a cell with alternative routing between the active gate and the isolation gate structure, according to some embodiments.
Figure 6:
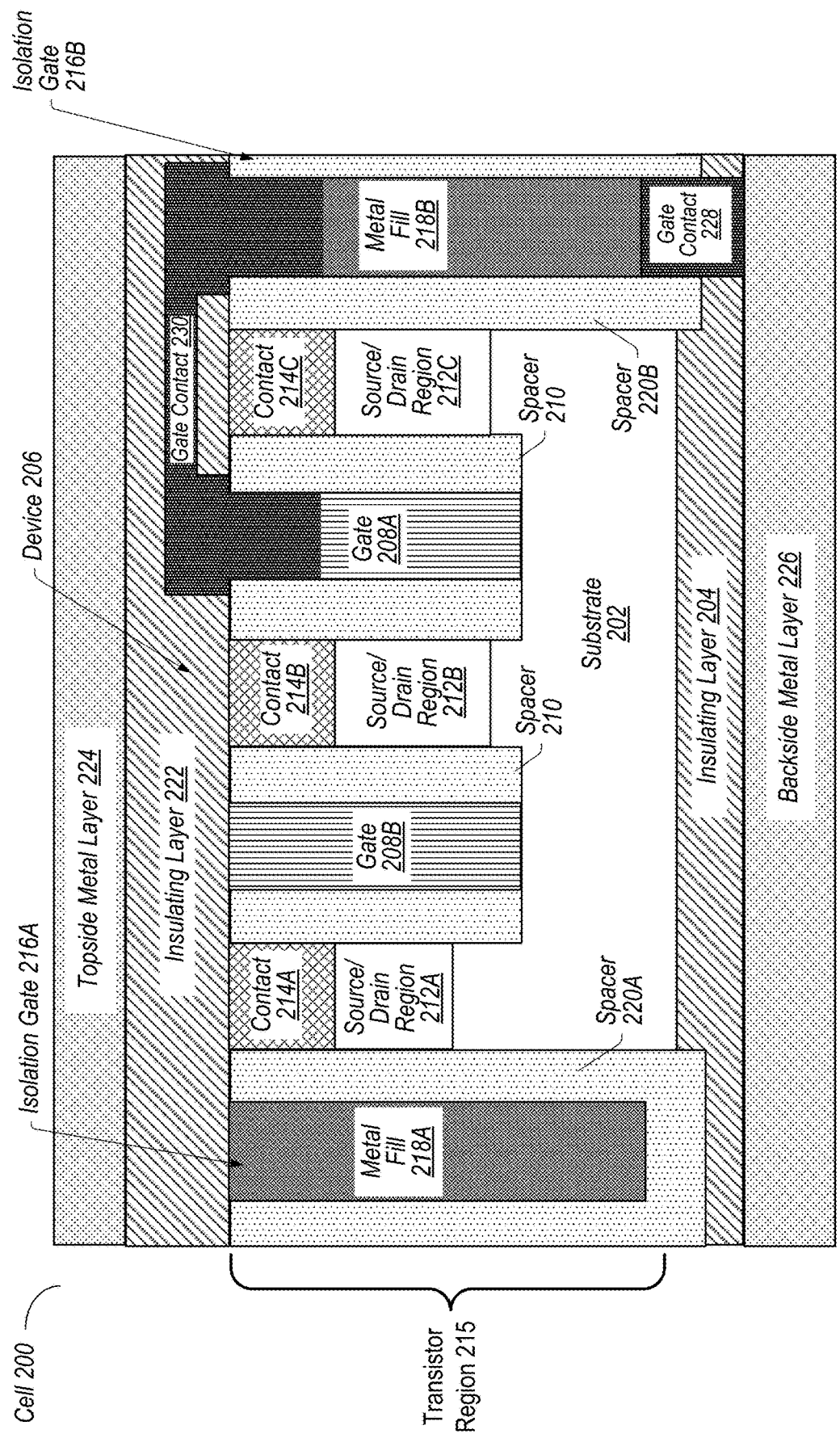
FIG. 6 depicts a cross-sectional representation of a cell along the sectional lines 6-6 shown in FIG. 5, according to some embodiments.

FIG. 5 depicts representations of an embodiment of a cell with alternative routing between the active gate and the isolation gate structure, according to some embodiments. In FIG. 5, (A) is a top-view representation of the embodiment of cell 200 and (B) is a bottom-view representation of the embodiment of the cell. FIG. 6 depicts a cross-sectional representation of cell 200 along the sectional lines 6-6 shown in FIG. 5, according to some embodiments. The sectional lines 6-6 are positioned across the signal portions of topside metal layer 224 and backside metal layer 226, as shown in (B) of FIG. 5. A representation of gate contact 230, described further below, is depicted in (A) of FIG. 5 along with the representation of gate contact 228, described herein, depicted in (B) of FIG. 5.

In the illustrated embodiment of FIG. 6, connection between the signal input of gate 208A and the top of metal fill 218B is made by gate contact 230 positioned in insulating layer 222. In certain embodiments, gate contact 230 includes gate contact vias made from the signal input of the gate 208A and the top of metal fill 218B into insulating layer 222. The gate contact vias then connect to a metal wire (or other metal routing) formed in insulating layer 222. In various embodiments, the metal wire portion of gate contact 230 is formed in a single layer of insulating layer 222 when the insulating layer includes multiple insulating layers. In some embodiments, insulating layer 222 may have an increased thickness (as compared to, for example, insulating layer 122, shown in FIG. 1) to provide space for positioning of the metal wire portion of gate contact 230 inside the insulating layer with electrical insulation both above and below the metal wire.

Using gate contact 230 to provide the connection between the signal input of gate 208A and the top of metal fill 218B provides this connection without the need for utilization of resources in topside metal layer 224. For example, gate contact 230 is a localized jumper or shunt between the signal input of gate 208A and the top of metal fill 218B.

Figure 7:
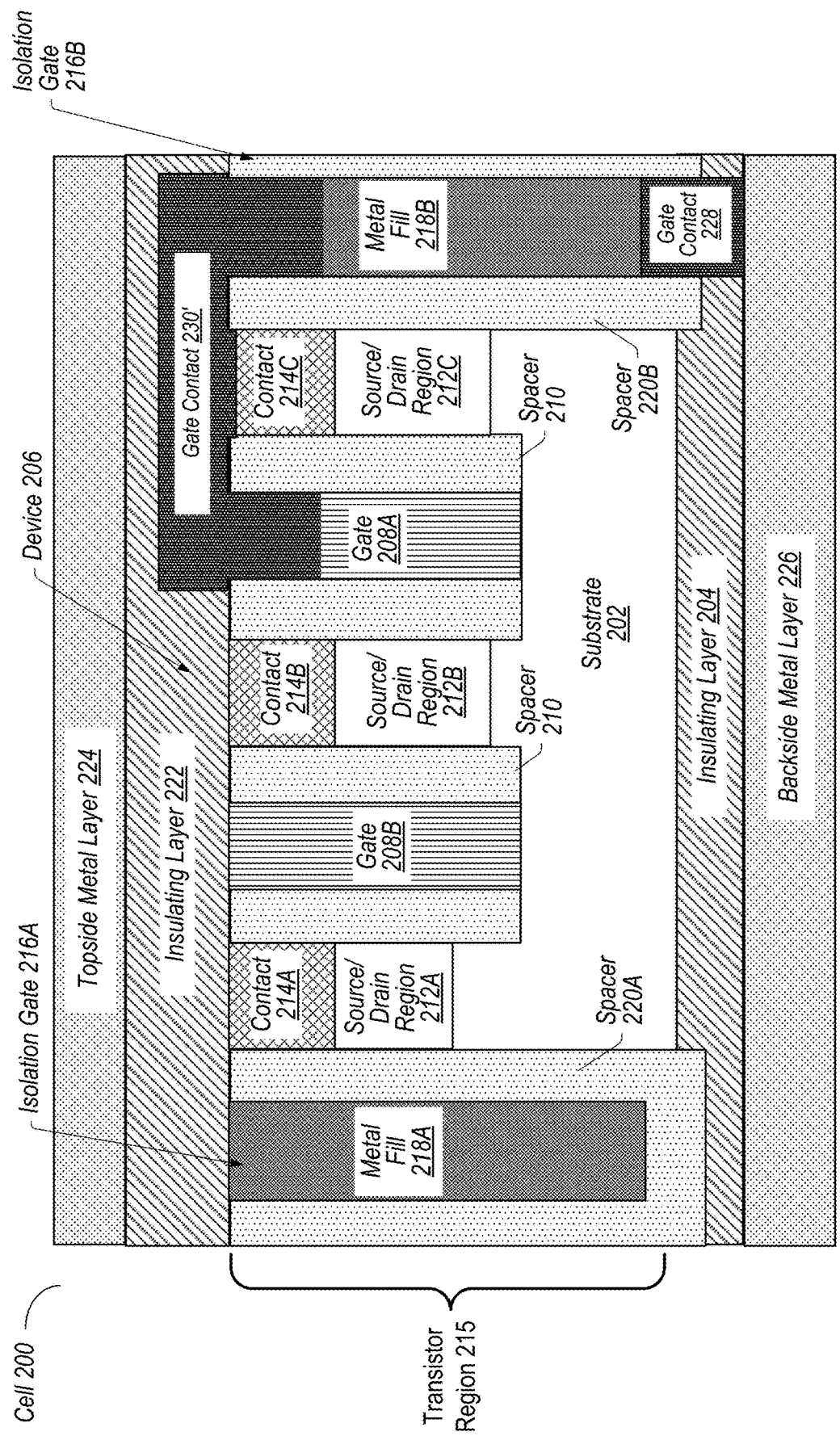
FIG. 7 depicts a cross-sectional representation of a cell with the gate contact connecting to the signal input and source/drain of the active gate, according to some embodiments.

In some embodiments, gate contact 230 may be implemented to additionally pickup signals from a source/drain region in device 206. FIG. 7 depicts a cross-sectional representation of a cell with the gate contact connecting to the signal input and source/drain of the active gate, according to some embodiments. In the illustrated embodiment, gate contact 230', which is positioned in insulating layer 222, connects to contact 214C for source/drain region 212C in addition to the connections to the signal input of gate 208A and the top of metal fill 218B. Connection to both the signal input of gate 208A and source/drain region 212C in device 206 may allow for additional implementations of cell 200.

Figure 8:
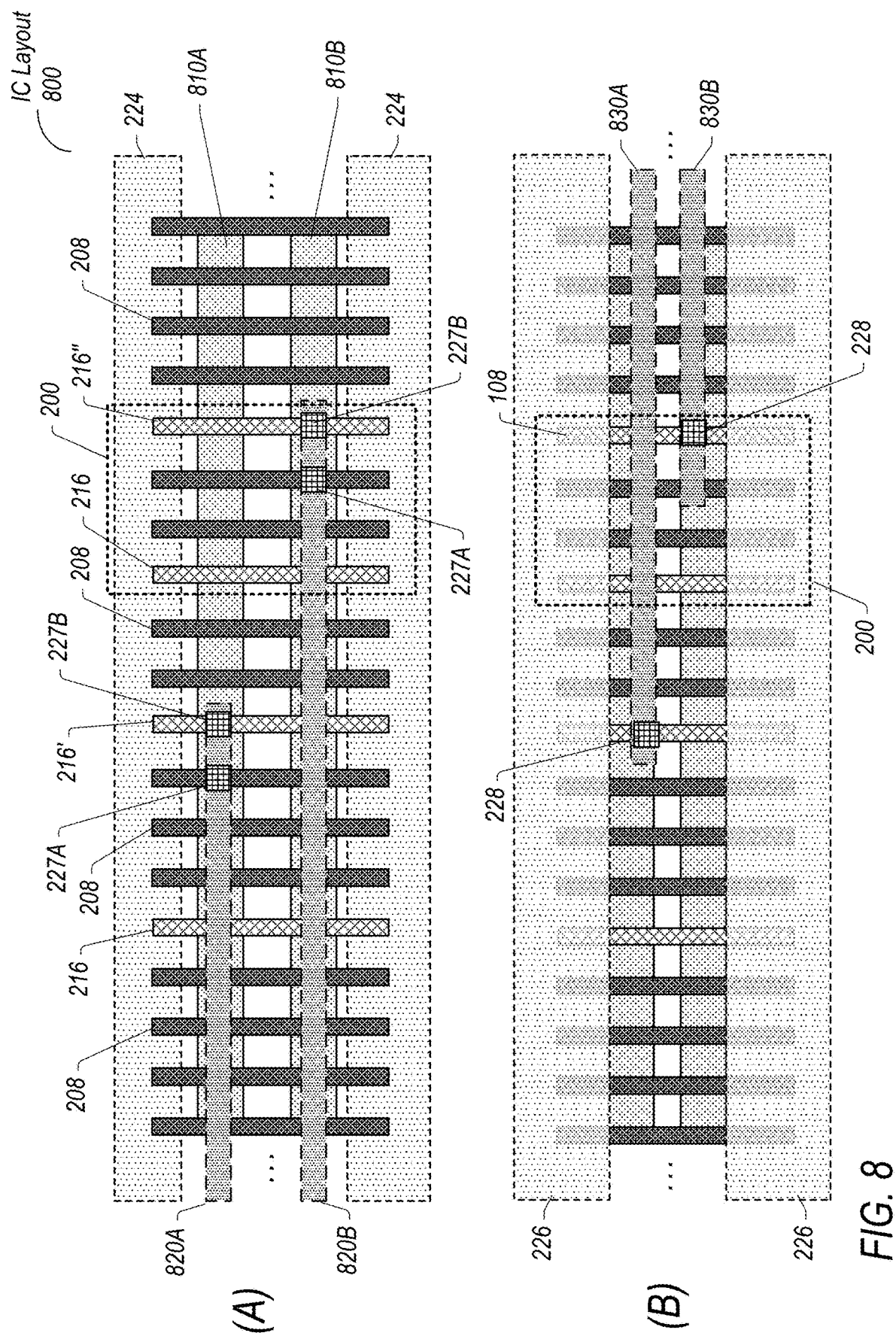
FIG. 8 depicts representations of an embodiment of an integrated circuit layout having isolation gates with signal routing in both the topside and backside layers, according to some embodiments.

Embodiments described herein provide for routing of signal paths (e.g., control signal paths) through the backside of an integrated circuit device by utilizing metal fill in isolation gates in the layout of the integrated circuit device to provide connection between active gates and the backside layer. FIG. 8 depicts representations of an embodiment of an integrated circuit layout having isolation gates with signal routing in both the topside and backside layers, according to some embodiments. In FIG. 8, (A) is a top-view representation of the embodiment of integrated circuit layout 800 and (B) is a bottom-view representation of the embodiment of the integrated circuit layout. For better understanding of the current disclosure, a dashed box representing cell 200 (depicted in FIGS. 3 and 4) is shown in layout 800.

In layout 800, regions 810A, 810B are active regions of the integrated circuit device. Layout 800 includes multiple instances of active gates 208 and isolation gates 216 laid out along regions 810A, 810B between topside metal layers 224, in (A), and backside metal layers 226, in (B). In the illustrated embodiment, layout 800 includes topside signal tracks 820A, 820B, shown in (A), and backside signal tracks 830A, 830B, shown in (B). Topside signal track 820A and backside signal track 830A correspond to region 810A while topside signal track 820B and backside signal track 830B correspond to region 810B.

As shown in FIG. 8, signal routing through an active region may be implemented in both the topside and backside of the device using the routing connections between topside metal layer 224 and backside metal layer 226 provided at isolation gates 216. For instance, for active region 810A, topside signal track 820A provides the signal route until reaching isolation gate 216', as shown from left to right in (A). At isolation gate 216', the signal route is routed to backside signal track 830A and propagated out of the layout to the right, as shown in (B). In active region 810B, topside signal track 820B provides the signal route until reaching isolation gate 216", as shown from left to right in (A), at which the signal route is routed to backside signal track 830B and propagated out of the layout to the right, as shown in (B). It should be understood that while layout 800 in FIG. 8 depicts an embodiment utilizing topside metal layer 224 for topside signal routing (as described in the embodiment of FIGS. 3 and 4), a layout similar to layout 800 may be used in embodiments that implement metal wires in insulating layers (e.g., the embodiment of FIGS. 5-7) for topside signal routing.

As shown in FIG. 8, adding the ability to route signals through the backside of the device in integrated circuit layout 800 at isolation gates 216 allows backside signal routing to be combined with topside signal routing. Combining the signal routing on the backside of the integrated circuit device with the signal routing on the topside of the integrated circuit device (e.g., signal routing on both the topside and backside) may provide advantages such as, but not limited to, reducing RC delay for signal transmission in the integrated circuit while enabling improved power routing characteristics with little to no impact on area scaling in the integrated circuit device.

Figure 9:
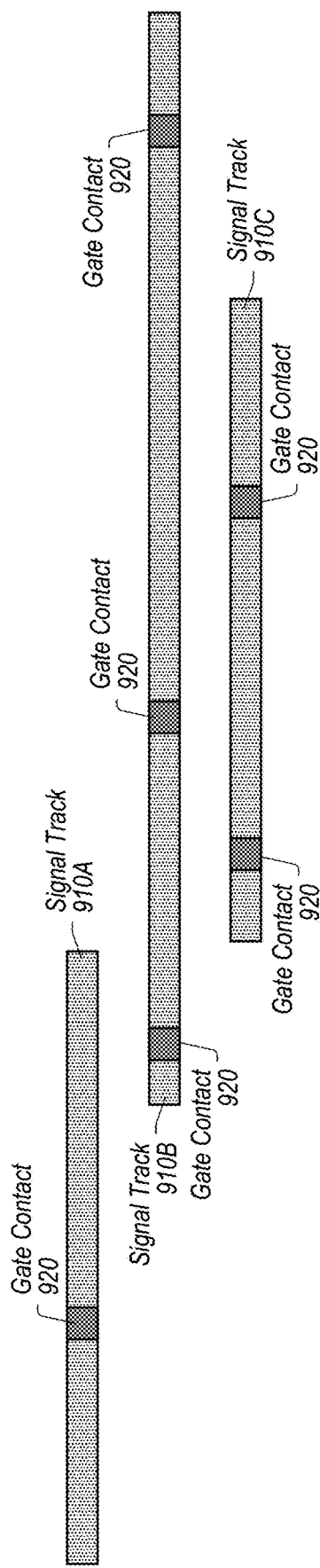
FIG. 9 depicts a representation of topside signal tracks in an integrated circuit layout with topside only signal routing, according to some embodiments.

Further, utilizing backside signal routing in addition to topside routing may reduce the number of topside signal tracks needed in an integrated circuit layout. In topside only signal routing, typically multiple signal tracks are needed to route signals for parallel active regions. For instance, three topside signal tracks are typically needed with two active regions to provide spacing for making contacts to each of the active regions. FIG. 9 depicts a representation of topside signal tracks in an integrated circuit layout with topside only signal routing, according to some embodiments. In the illustrated embodiment, three signal tracks 910A, 910B, 910C are needed to provide sufficient spacing (e.g., x-y spacing in the depiction) for various gate contacts 920 to make connections to the underlying gates.

Figure 10:
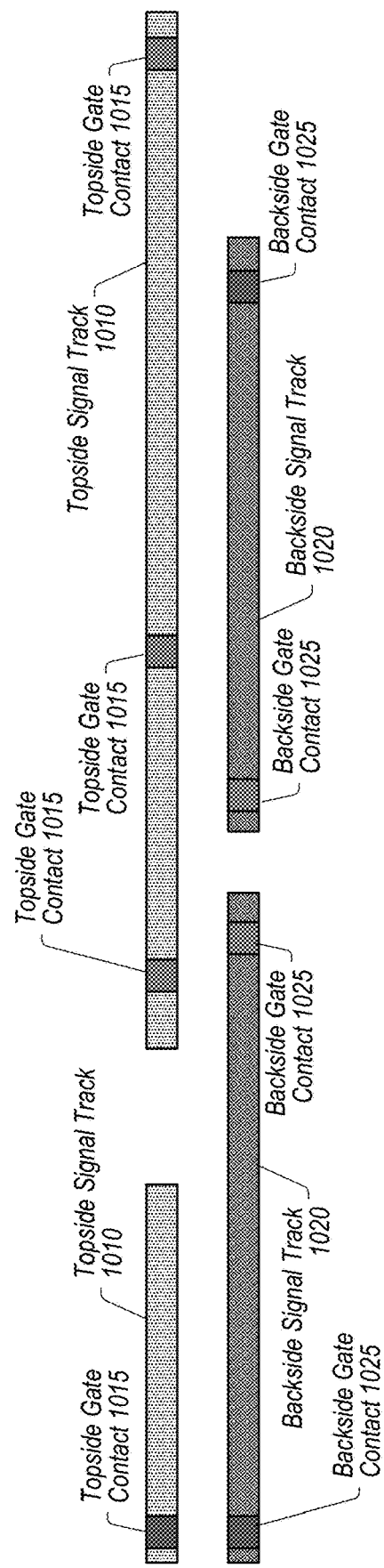
FIG. 10 depicts a representation of topside signal tracks and backside signal tracks in an integrated circuit layout with topside and backside signal routing, according to some embodiments.

FIG. 10 depicts a representation of topside signal tracks and backside signal tracks in an integrated circuit layout with topside and backside signal routing, according to some embodiments. In the illustrated embodiment of FIG. 10, the addition of backside signal routing allows the integrated circuit layout to have only a single topside signal track 1010 and a single backside signal track 1020. Only single tracks are needed as topside gate contacts 1015 and backside gate contacts 1025 may be positioned with closer x-y spacing in the depiction because of the variation in depth (the z-direction in the depiction).

Figure 11:
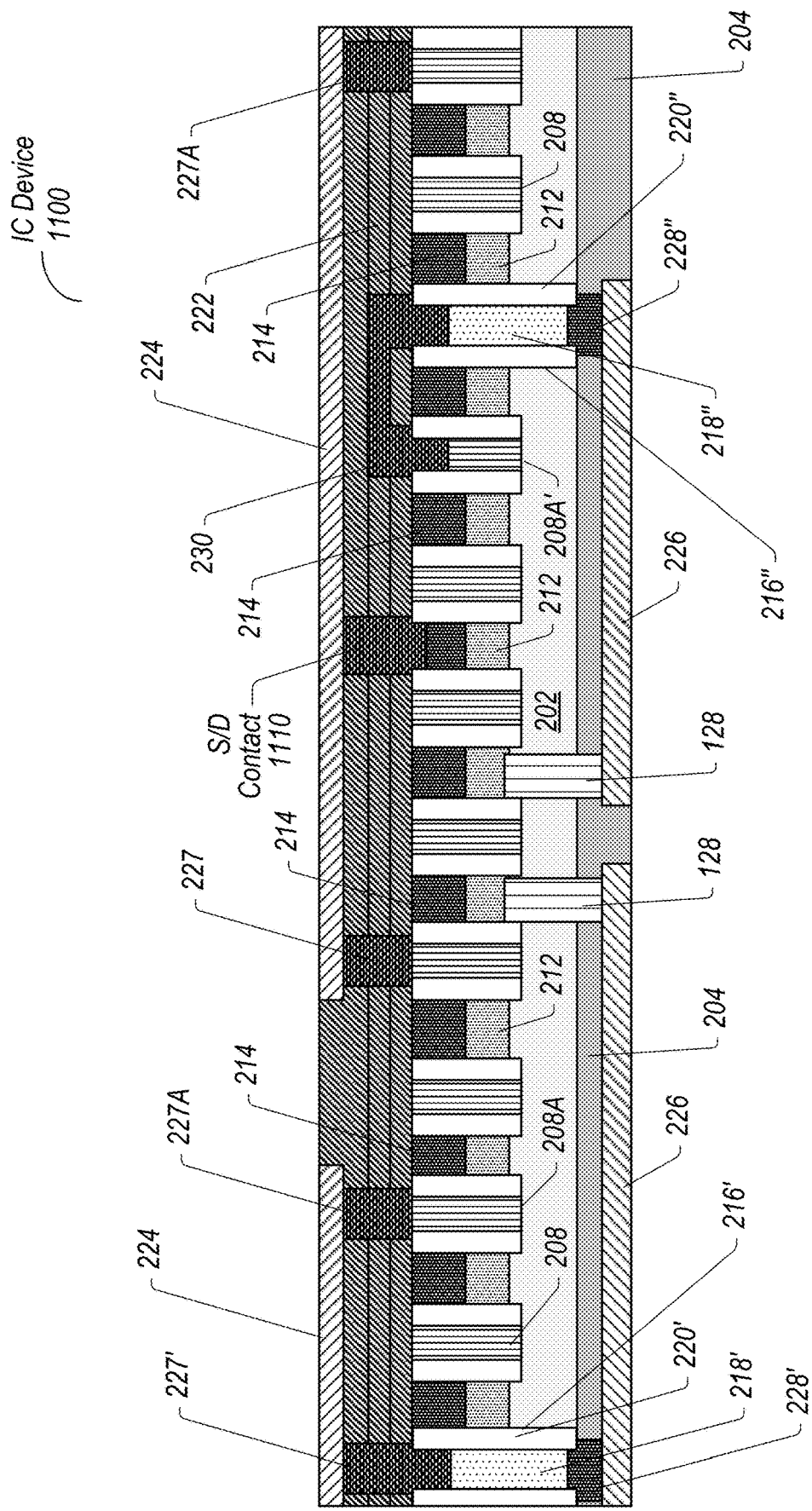
FIG. 11 depicts a cross-sectional representation of an integrated circuit device having both types of routing connections between signal inputs of active gates and metal fill in isolation gates, according to some embodiments.

Various additional embodiments of integrated circuit devices may be contemplated that include connections between signal inputs of active gates and metal fill in isolation gates utilizing a combination of routing through the topside metal layer (as shown in the embodiment of FIG. 4) and routing through a metal wire in the topside insulation layer (as shown in the embodiment of FIG. 6). FIG. 11 depicts a cross-sectional representation of an integrated circuit device having both types of routing connections between signal inputs of active gates and metal fill in isolation gates, according to some embodiments. In various embodiments, integrated circuit device 1100 includes two isolation gates 216', 216" with multiple active gates 208 between the isolation gates (and two active gates to the right of isolation gate 216" in the depiction) in the transistor region above substrate 202 and insulating layer 204. Active gates 208 have source/drain regions 212, with contacts 214, positioned between the gates while isolation gates 216', 216" have metal fill 218', 218" surrounded by gate spacers 220', 220".

In the illustrated embodiment, metal fill 218' in isolation gate 216' is connected to signal routing in topside metal layer 224 by gate contact 227'. Metal fill 218' is also connected to signal routing in backside metal layer 226 by gate contact 228'. The signal routing in topside metal layer 224 is then connected to the signal input of active gate 208A by gate contact 227A to complete the routing between the signal input of active gate 208A and signal routing in backside metal layer 226.

Metal fill 218" in isolation gate 216" is connected to the signal input of active gate 208A' by gate contact 230, which is position in insulating layer 222. Metal fill 218" is also connected to signal routing in backside metal layer 226 by gate contact 228". Accordingly, the signal routing between the signal input of active gate 208A' and signal routing in backside metal layer 226 is completed through metal fill 218" in isolation gate 216", gate contact 228", and gate contact 230. Additionally, device 1100 may include one or more source/drain contacts 1110 providing signal connection between source/drain regions 212 and routing in topside metal layer 224.

Various embodiments of device 1100 may also include power routing to backside metal layer 226. For instance, as shown in FIG. 11, device 1100 includes backside vias 128 connecting source/drain regions 212 to backside metal layer 226. Backside vias 128 may connect to power routing in backside metal layer 226. The power routing in backside metal layer 226 may be distinct from signal routing in the backside metal layer. Thus, backside metal layer 226 provides both power and signal routing in device 1100 with electrical separation between the different routing paths. Additional implementations of the utilization of connections between signal inputs of active gates and metal fill in isolation gates through a combination of routing through the topside metal layer and routing through a metal wire in the topside insulation layer may be contemplated without varying from the scope of the current disclosure.

Figure 12:
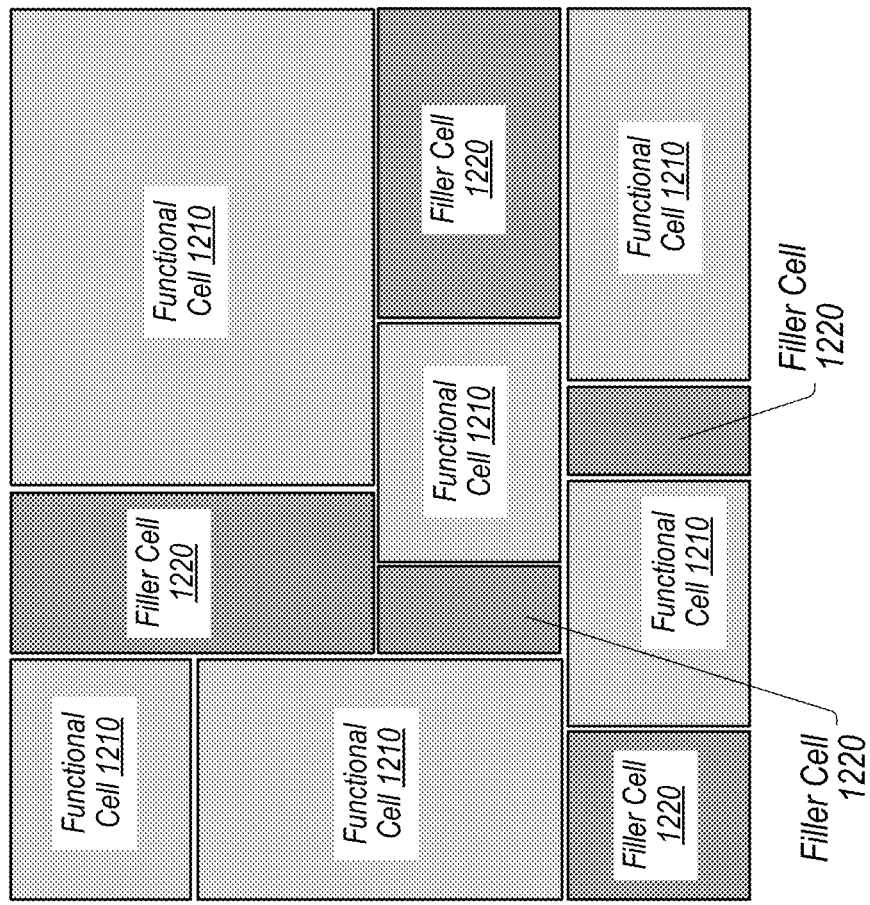
FIG. 12 depicts a top-view representation of an integrated circuit layout with functional cells and filler cells, according to some embodiments.

In various embodiments, the structures of isolation gates 216 in cell 200 described herein (shown in FIGS. 3-7) may be implemented in a filler cell in an integrated circuit layout. Implementing isolation gates 216 in a filler cell may provide backside access for functional cells positioned adjacent to the filler cell. FIG. 12 depicts a top-view representation of an integrated circuit layout with functional cells and filler cells, according to some embodiments. In the illustrated embodiment, layout 1200 includes functional cells 1210 and filler cells 1220.

Figure 13:
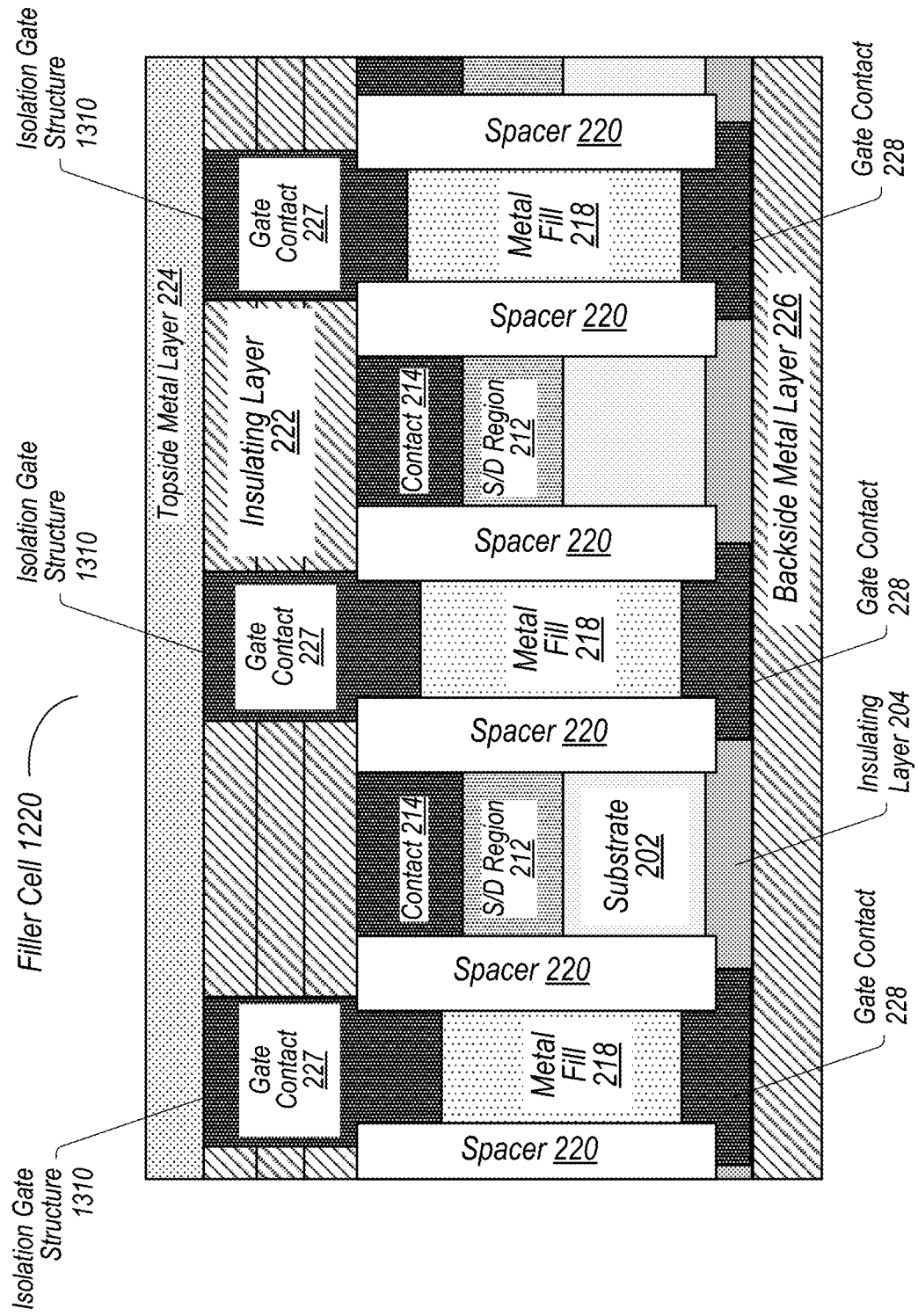
FIG. 13 depicts a cross-sectional representation of a filler cell with isolation gate structures for providing backside access, according to some embodiments.

FIG. 13 depicts a cross-sectional representation of a filler cell with isolation gate structures for providing backside access, according to some embodiments. In the illustrated embodiment, filler cell 1220 includes three isolation gate structures 1310. It should be understood that filler cell 1220 may include any number of isolation gate structures 1310. For example, the number of isolation gate structures 1310 may be determined by the size of filler cell 1220 with larger filler cells having larger numbers of isolation gate structures. Increasing the number of isolation gate structures 1310 in filler cell 1220 may reduce the resistance of the connection between topside metal layer 224 and backside metal layer 226 while reducing the number of isolation gate structures may reduce material or processing costs. Additionally, the widths of isolation gate structures 1310 may be varied to determine the resistance and material costs associated with filler cell 1220.

Isolation gate structures 1310 have similar structures to isolation gates 216, described herein. In the illustrated embodiment, isolation gate structures 1310 include metal fill 218 between spacers 220 and source/drain regions 212 with contacts 214 positioned between the isolation gate structures. Source/drain 212 and contacts 214 may be inactive in filler cell 1220 (e.g., the transistor region of filler cell 1220 is inactive). Embodiments may be contemplated where source/drain regions 212 and contacts 214 are not formed in filler cell 1220.

Gate contacts 227 connect the top of metal fill 218 in isolation gate structures 1310 to topside metal layer 224 while gate contacts 228 connect the bottom of the metal fill to backside metal layer 226. Accordingly, metal fill 218 connects topside metal layer 224 to backside metal layer 226. With the connection between topside metal layer 224 and backside metal layer 226 made in filler cell 1220, routing in topside metal layer 224 or backside metal layer 226 may be made between functional cells 1210, shown in FIG. 12, and the filler cell. Thus, filler cell 1220 provides a backside metal layer 226 access point for functional cells 1210 in layout 1200.

Example Computer System

Figure 14:
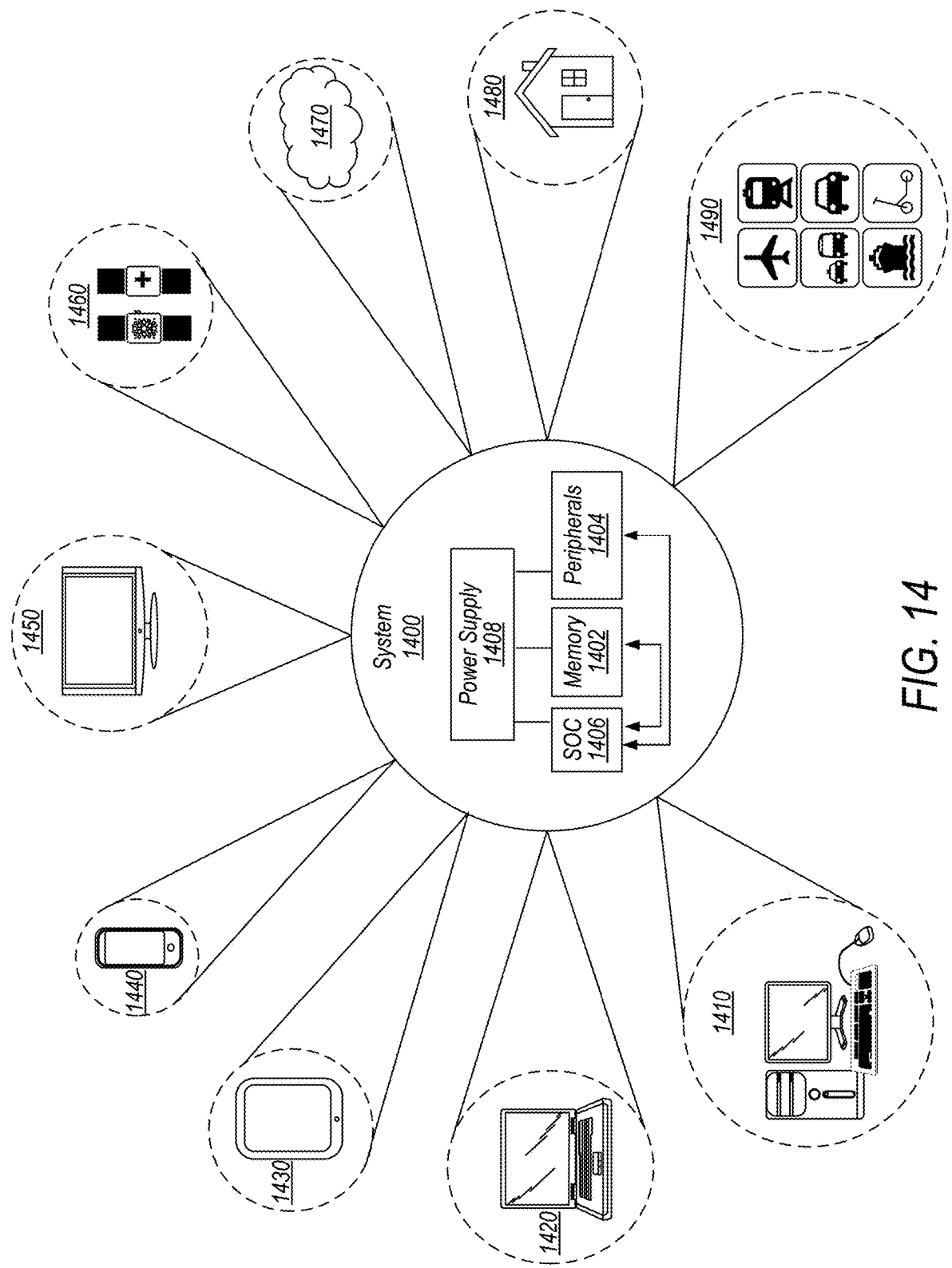
FIG. 14 is a block diagram of one embodiment of an example system.

Turning next to FIG. 14, a block diagram of one embodiment of a system 1400 is shown that may incorporate and/or otherwise utilize the methods and mechanisms described herein. In the illustrated embodiment, the system 1400 includes at least one instance of a system on chip (SoC) 1406 which may include multiple types of processing units, such as a central processing unit (CPU), a graphics processing unit (GPU), or otherwise, a communication fabric, and interfaces to memories and input/output devices. In some embodiments, one or more processors in SoC 1406 includes multiple execution lanes and an instruction issue queue. In various embodiments, SoC 1406 is coupled to external memory 1402, peripherals 1404, and power supply 1408.

A power supply 1408 is also provided which supplies the supply voltages to SoC 1406 as well as one or more supply voltages to the memory 1402 and/or the peripherals 1404. In various embodiments, power supply 1408 represents a battery (e.g., a rechargeable battery in a smart phone, laptop or tablet computer, or other device). In some embodiments, more than one instance of SoC 1406 is included (and more than one external memory 1402 is included as well).

The memory 1402 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1404 include any desired circuitry, depending on the type of system 1400. For example, in one embodiment, peripherals 1404 includes devices for various types of wireless communication, such as Wi-Fi, Bluetooth, cellular, global positioning system, etc. In some embodiments, the peripherals 1404 also include additional storage, including RAM storage, solid state storage, or disk storage. The peripherals 1404 include user interface devices such as a display screen, including touch display screens or multi-touch display screens, keyboard or other input devices, microphones, speakers, etc.

As illustrated, system 1400 is shown to have application in a wide range of areas. For example, system 1400 may be utilized as part of the chips, circuitry, components, etc., of a desktop computer 1410, laptop computer 1420, tablet computer 1430, cellular or mobile phone 1440, or television 1450 (or set-top box coupled to a television). Also illustrated is a smartwatch and health monitoring device 1460. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1400 may further be used as part of a cloud-based service(s) 1470. For example, the previously mentioned devices, and/or other devices, may access computing resources in the cloud (i.e., remotely located hardware and/or software resources). Still further, system 1400 may be utilized in one or more devices of a home 1480 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 14 is the application of system 1400 to various modes of transportation 1490. For example, system 1400 may be used in the control and/or entertainment systems of aircraft, trains, buses, cars for hire, private automobiles, waterborne vessels from private boats to cruise liners, scooters (for rent or owned), and so on. In various cases, system 1400 may be used to provide automated guidance (e.g., self-driving vehicles), general systems control, and otherwise. These any many other embodiments are possible and are contemplated. It is noted that the devices and applications illustrated in FIG. 14 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
a transistor formed in a transistor region of an integrated circuit, the transistor having an active gate with a signal input;
a metal layer located below the transistor region in a vertical dimension perpendicular to the transistor region;
a gate structure formed in the transistor region of the integrated circuit, the gate structure including a metal fill positioned between gate spacers in the transistor region, wherein the gate structure is positioned on a first side of the transistor in a horizontal dimension perpendicular to the vertical dimension, and wherein the metal fill is connected to the metal layer; and
a metal wire located above the transistor region in the vertical dimension, wherein the metal wire connects the metal fill to the signal input of the active gate.

2. The apparatus of claim 1, further comprising an upper metal layer located above the transistor region in the vertical dimension, wherein the metal wire is positioned in the upper metal layer.

3. The apparatus of claim 1, further comprising:
an upper metal layer located above the transistor region in the vertical dimension; and
an insulation layer positioned between the transistor region and the upper metal layer, wherein the metal wire is positioned in the insulation layer.

4. The apparatus of claim 1, wherein the metal fill and the gate spacers in the gate structure extend below the transistor in the vertical dimension, and wherein the metal fill in the gate structure is separated from the first side of the transistor by at least one of the gate spacers to provide electrical isolation between the metal fill and the active gate.

5. The apparatus of claim 1, further comprising a second gate structure formed in the transistor region of the integrated circuit, the second gate structure including a second metal fill positioned between second gate spacers in the transistor region, wherein the second gate structure is positioned on a second side of the transistor in the horizontal dimension, the second side being on an opposite side of the first side of the transistor in the horizontal dimension.

6. The apparatus of claim 1, further comprising a control signal routed to the signal input of the active gate, wherein the control signal is routed from the metal layer to the signal input through the metal fill and the metal wire.

7. The apparatus of claim 1, further comprising a metal signal wire in the metal layer, wherein the metal fill connects the signal input of the active gate to the metal signal wire.

8. The apparatus of claim 7, wherein the metal signal wire is connected to at least one additional transistor formed in the transistor region of the integrated circuit.

9. The apparatus of claim 1, further comprising:
an insulation layer positioned between the transistor region and the metal layer; and a gate contact via in the insulation layer, the gate contact via providing connection between the metal fill and the metal layer.

10. An apparatus, comprising:

a transistor formed in a transistor region of an integrated circuit;

a first metal layer located above the transistor region in a vertical dimension perpendicular to the transistor region;

a second metal layer located below the transistor region in the vertical dimension; and a gate structure formed in the transistor region of the integrated circuit, the gate structure including a metal fill positioned between gate spacers in the transistor region, wherein the gate structure is positioned on a first side of the transistor in a horizontal dimension perpendicular to the vertical dimension, and wherein the metal fill connects the first metal layer and the second metal layer.

11. The apparatus of claim 10, further comprising:

an active gate in the transistor, the active gate having a signal input, wherein the signal input is connected to the metal fill through the first metal layer.

12. The apparatus of claim 10, further comprising:

an active gate in the transistor, the active gate having a signal input; and a first metal wire located in the first metal layer, wherein the first metal wire connects the signal input to the metal fill.

13. The apparatus of claim 12, further comprising:

a second metal wire located in the second metal layer;

wherein the second metal wire is connected to the signal input through the metal fill and the first metal wire.

14. The apparatus of claim 10, wherein the transistor and the gate structure are positioned in a filler cell, the transistor in the transistor region of the filler cell being inactive, the apparatus further comprising:

a functional cell positioned adjacent to the filler cell, wherein the functional cell includes an active transistor having an active gate with a signal input, wherein the signal input of the active transistor is coupled to the first metal layer, and wherein the second metal layer provides routing for a control signal between the signal input and a backside metal layer of the functional cell.

15. The apparatus of claim 10, further comprising:

an insulation layer positioned between the transistor region and the first metal layer;

a first gate contact via in the insulation layer, the first gate contact via connecting the metal fill and the first metal layer, and a second gate contact via in the insulation layer, the second gate contact via connecting a signal input of an active gate in the transistor and the first metal layer.

16. An apparatus, comprising:

a transistor formed in a transistor region of an integrated circuit;

a first insulation layer located above the transistor region in a vertical dimension perpendicular to the transistor region;

a metal layer located below the transistor region in the vertical dimension;

a second insulation layer located between the transistor region and the metal layer in the vertical dimension;

a gate structure formed in the transistor region of the integrated circuit, the gate structure including a metal fill positioned between gate spacers in the transistor region, wherein the gate structure is positioned on a first side of the transistor in a horizontal dimension perpendicular to the vertical dimension;

a metal wire positioned in the first insulation layer, wherein the metal wire is connected to the metal fill; and a gate contact via positioned in the second insulation layer, wherein the gate contact via connects the metal fill to the metal layer.

17. The apparatus of claim 16, further comprising an active gate in the transistor, wherein a signal input of the active gate is connected to the metal layer by the metal wire the metal fill, and the gate contact via.

18. The apparatus of claim 17, wherein a source/drain region of the active gate is connected to the metal wire.

19. The apparatus of claim 17, further comprising:

a first gate contact via in the first insulation layer, the first gate contact via connecting the metal fill and the metal wire; and a second gate contact via in the first insulation layer, the second gate contact via connecting the signal input of the active gate and the metal wire.

20. The apparatus of claim 16, further comprising an upper metal layer located above the transistor region, wherein the upper metal layer is electrically isolated from the metal wire.

* * * * *